US012731374B2

(12) United States Patent
Kandemir

(10) Patent No.: US 12,731,374 B2
(45) Date of Patent: Sep. 8, 2026

(54) SAFE CONTROL/MONITORING OF A COMPUTER-CONTROLLED SYSTEM

(71) Applicant: Robert Bosch GmbH, Stuttgart (DE)

(72) Inventor: Melih Kandemir, Agedrup (DK)

(73) Assignee: ROBERT BOSCH GMBH, Stuttgart (DE)

( * ) Notice: Subject to any disclaimer, the term of this patent is extended or adjusted under 35 U.S.C. 154(b) by 388 days.

(21) Appl. No.: 18/259,906

(22) PCT Filed: May 17, 2022

(86) PCT No.: PCT/EP2022/063345
§ 371 (c)(1),
(2) Date: Jun. 29, 2023

(87) PCT Pub. No.: WO2022/243329
PCT Pub. Date: Nov. 24, 2022

(65) Prior Publication Data

US 2024/0071048 A1 Feb. 29, 2024

(30) Foreign Application Priority Data

May 21, 2021 (DE) ..................... 10 2021 205 274.6

(51) Int. Cl.
*G06V 10/764* (2022.01)
*G05B 15/02* (2006.01)
*G06V 20/56* (2022.01)

(52) U.S. Cl.
CPC ........... *G06V 10/764* (2022.01); *G05B 15/02* (2013.01); *G06V 20/588* (2022.01)

(58) Field of Classification Search
CPC .... G06V 10/764; G06V 20/588; G05B 15/02; G06N 20/00
See application file for complete search history.

(56) References Cited

U.S. PATENT DOCUMENTS 11,348,269 B1 * 5/2022 Ebrahimi Afrouzi ... G01S 17/48
11,580,785 B1 * 2/2023 Kundu .................. G06V 40/28
(Continued)

FOREIGN PATENT DOCUMENTS

CN 112241788 A 1/2021
DE 102019206720 A1 11/2020
WO 2020247200 A1 12/2020

OTHER PUBLICATIONS

International Search Report for PCT/EP2022/063345, Issued Oct. 10, 2022.

(Continued)

*Primary Examiner* — Solomon G Bezuayehu
(74) *Attorney, Agent, or Firm* — NORTON ROSE FULBRIGHT US LLP

(57) ABSTRACT

A computer-implemented method of classifying sensor data for use in controlling and/or monitoring a computer-controlled system. The classification model includes an inference model that, based on the sensor data, determines respective concentration parameters of a Dirichlet distribution of class probabilities for the respective multiple classes. The classification model further includes a generative model that, based on the class probabilities, determines parameters of a probability distribution of sensor data according to a training dataset of the classification model. Concentration parameters according to the inference model are used for anomaly detection by determining a probability of the sensor data being generated according to the generative model based on the concentration parameters. The same concentration parameters are used to determine class probabilities.

17 Claims, 7 Drawing Sheets

(56) References Cited

U.S. PATENT DOCUMENTS

| | | | | |
|---|---|---|---|---|
| 2019/0013014 | A1 | 1/2019 | Sverrisson et al. | |
| 2019/0294149 | A1 * | 9/2019 | Kolouri | B25J 9/1697 |
| 2020/0326667 | A1 | 10/2020 | Ahuja et al. | |
| 2021/0103814 | A1 * | 4/2021 | Tsiligkaridis | G06N 3/09 |
| 2021/0182631 | A1 * | 6/2021 | Baker | G06N 20/10 |
| 2022/0139551 | A1 * | 5/2022 | Kosecoff | G16H 10/60 705/2 |
| 2025/0201125 | A1 * | 6/2025 | Hong | G06N 3/09 |

OTHER PUBLICATIONS

Sensoy et al., "Misclassification Risk and Uncertainty Quantification in Deep Classifiers," 2021 IEEE Winter Conference on Applications of Computer Vision (WACV), IEEE, 2021, pp. 2483-2491.

Sensoy et al., "Evidential Deep Learning to Quantify Classification Uncertainty," 32nd Conference on Neural Information Processing Systems (NIPS 2018), 2018, p. 1-12.

Kull et al., "Beyond Temperature Scaling: Obtaining Well-Calibrated Multiclass Probabilities With Dirichlet Calibration," 33rd Conference on Neural Information Processing Systems (NEURIPS 2019), 2019, pp. 1-27.

Sensoy et al., "Uncertainty-Aware Deep Classifiers Using Generative Models," the Thirty-Fourth AAAI Conference on Artificial Intelligence (AAAI-20), 2020, pp. 5620-5627.

Hu et al., "Multidimensional Uncertainty-Aware Evidential Neural Networks," Association for the Advancement of Artificial Intelligence, 2021, pp. 1-8.

Kingma et al., "ADAM: A Method for Stochastic Optimization," Cornell University, 2017, pp. 1-15.

* cited by examiner

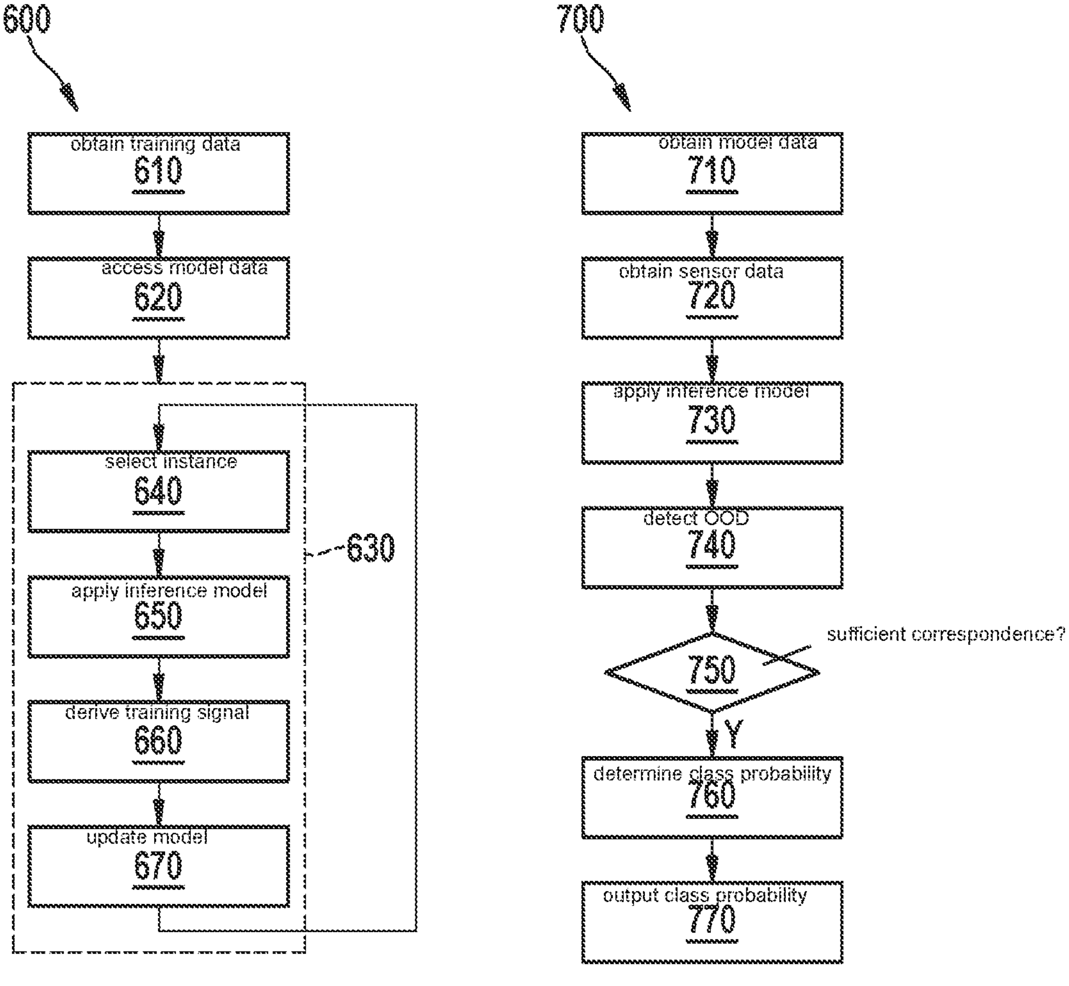
Fig. 6
Fig. 7
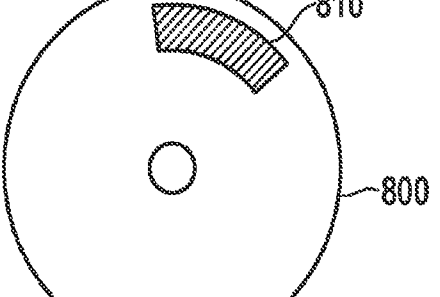
Fig. 8

SAFE CONTROL/MONITORING OF A COMPUTER-CONTROLLED SYSTEM

FIELD

The present invention relates to a computer-implemented method of classifying sensor data for use in controlling and/or monitoring a computer-controlled system, and to a corresponding system. The present invention further relates to a computer-implemented method of training a classification model for use in controlling and/or monitoring a computer-controlled system and to a corresponding system. The present invention further relates to a computer-readable medium comprising instructions and/or model data.

BACKGROUND INFORMATION

Cars and other vehicles are making more and more autonomous decisions based on the classification of sensor data. For example, in vehicles available on the market today, lane keeping support systems use sensor data, such as images of the environment of the vehicle or features extracted from such images, to recognize the driver task, e.g., keeping the lane or changing it. The lane keeping support system can then use the recognized task to assist the driver in the appropriate way. In future vehicles, an increasing number of tasks, and also tasks that involve an increasing amount of risk if they are performed incorrectly, will be performed autonomously based on classified sensor data. The same can be said for many other computer-controlled systems, including robotic systems, domestic appliances, manufacturing machines, personal assistants, access control systems, drones, nanorobots, and heating control systems.

Misclassification of sensor data can lead to wrong automated decisions, with potentially dangerous consequences. Such misclassification can happen in particular if a classification model is applied to sensor data inputs that do not sufficiently correspond to the data that the model was trained on, for example, sensor data representing an uncommon traffic situation not encountered in the training dataset, or sensor data coming from faulty measurements. For this reason, it is important to detect out-of-distribution ("OOD") samples, that is, sensor data inputs that does not sufficiently correspond to the training dataset on which the classification model is trained. If sensor data is detected to be OOD, for example, it is possible to alert a human, to switch to a fallback mechanism, and/or to assign less importance to the output by the classification model.

In the paper "Evidential Deep Learning to Quantify Classification Uncertainty" by M. Sensoy et al. (available at https://arxiv.org/abs/1806.01768 and incorporated herein by reference), an explicit modelling of prediction uncertainty of a multi-class classification model is proposed. The predictor for a multi-class classification problem is a Dirichlet distribution whose parameters are set by the continuous output of a neural net. Based on these parameters, both class labels and an uncertainty can be determined.

SUMMARY

Although the conventional multi-class classifier can be used to determine if sensor data is OOD or not, e.g., whether it represents a sensor misreading or an uncommon situation, it has the disadvantage that it does not provide calibrated in-domain uncertainties. In-domain uncertainties are important because sensor data that is not OOD, may still be hard to classify. For example, the sensor data may represent an edge case between whether a driver is keeping lane or switching lane. Also this type of uncertainty is important in order to determine how to use the classifier output for the controlling or monitoring, since it also determines how strongly a controller can rely on a given classification.

It is particularly desirable if such in-domain uncertainty can be determined in the form of a probability that the input data belongs to a given class that is calibrated, e.g., trained such that, from a set of inputs for which the model provides a probability of 70%, approximately 70% of inputs of the set do belong to that given class, etc. For example, having such calibrated uncertainty values allows to compare uncertainty information for different sensor inputs and/or computed according to different versions of the same model.

It would be desirable to provide techniques for classifying sensor data for use in controlling and/or monitoring a computer-controlled system, that provide better calibrated in-domain uncertainties in addition to determining if the sensor data is out-of-distribution.

In accordance with a first aspect of the present invention, a computer-implemented method and a corresponding system are provided for classifying sensor data for use in controlling and/or monitoring a computer-controlled system. In accordance with a further aspect of the present invention, a computer-implemented method and a corresponding system are provided for training a classification model for use in controlling and/or monitoring a computer-controlled system. In accordance with an aspect of the present invention, a computer-readable medium is provided.

Various aspects relate to a classification model that classifies sensor data into a class from a set of multiple classes. For example, the classification model may output one overall classification of the sensor data, or the classification model may comprise multiple respective classifications into the set of classes for respective portions of the sensor data. For example, for time-series sensor data, respective classes for respective time points may be determined. For image data, the classification model may determine respective classes for respective image portions (e.g., pixels), e.g., the classification model may be an image segmentation model.

Classification models described herein may comprise both a trained inference model, and a trained generative model. Given sensor data, the inference model may determine concentration parameters of a Dirichlet distribution of class probabilities for the respective classes into which the sensor data may be classified. Interestingly, these concentration parameters may be used as input both to determining an out-of-distribution value using a generative model, and to determining class probability values for respective classes (at least if the out-of-distribution value indicates a sufficient correspondence of the sensor data to the training dataset). The generative model may be trained to, given the class probabilities, determine parameters of a probability distribution of sensor data according to the training dataset. Accordingly, based on the determined concentration parameters, a probability of the sensor data being generated according to generative model can be determined, and this probability can serve as an out-of-distribution value indicating a correspondence of the sensor data to the training dataset of the classification model. Moreover, probabilities of the sensor data belonging to a particular class can be determined from the concentration parameters.

Interestingly, the inventors found that using the concentration parameters both to determine out-of-distribution values and to determine class probabilities, results in better calibrated class probabilities. Namely, when training the classification model, the classification model may effectively be forced to determine the concentration parameters in such a way that they not only allow to predict the correct class, but that they also allow the sensor data to be reproduced sufficiently accurately by the generative model. The inventors found that this serves as an effective mechanism to force the model to determine concentration parameters that better account for uncertainty about the sensor data.

For example, in "Evidential Deep Learning to Quantify Classification Uncertainty", there is no such mechanism to provide calibrated class probabilities. Effectively, this model may be trained by a combination of model fitting and regularization. The model fitting encourages the model to output the actual label for training data with maximal certainty. The regularization encourages the model to indicate that it is uncertain for out-of-distribution values. However, neither this model fitting nor this regularization provides a mechanism that encourages the model to provide calibrated probability values for in-distribution data. In contrast, by using concentration parameters that are also used as input to a generative model for OOD detection, as described herein, such a mechanism is provided. Indeed, the inventors found that class probability values derived according to the provided techniques are much more accurate in terms of calibration than class probability values derived from the Dirichlet distribution of "Evidential Deep Learning to Quantify Classification Uncertainty".

Interestingly, since the out-of-distribution value is determined using a generative model that is being trained to reproduce the sensor data from the concentration parameters, it may be enabled to train the classification model without the need for OOD samples. This is advantageous because it is by definition hard to obtain a representative set of OOD samples. Training a model on an explicit set of OOD samples results in a model that may not be able to detect OOD cases that do not resemble to the OOD training set. It is thus advantageous for the accuracy of OOD detection to learn its domain only through in-domain samples. For example, in an alternative approach, a classification model may be trained to output the correct class for in-domain samples of the training dataset, and to output maximal uncertainty for out-of-distribution samples of the training dataset. Such a training approach has the disadvantage of requiring OOD samples, and also does not provide a mechanism to provide calibrated in-domain probability values.

In contrast, by training a generative model on in-domain samples and using this model to determine out-of-distribution values, as provided herein according to the present invention, training only on in-domain samples is enabled and calibrated in-domain probability values can be determined. In particular, the classification model can be trained on a training dataset comprising sensor data inputs and corresponding target classes. The model may be trained by applying the inference model to the sensor data to obtain the concentration parameters, and deriving a training signal based on the concentration parameters. The training signal may then be used to update parameters of the inference model and/or the generative model.

Interestingly, the concentration parameters may be used to train both the classification and the OOD detection. To this end, the training signal may include a contribution for evidential classifier training and a contribution for density estimation. Thus, the model may determine the class probability values based on concentration parameters that are also trained to let the generative model reproduce the sensor data, leading to improved calibration.

In particular, for the evidential classifier training, the training signal may be based on a probability of the sensor data being classified into the target class based on the concentration parameters. The concentration parameters may define a probability distribution over class probabilities for the respective classes, and these class probabilities may in turn define the probability of the sensor data being classified into the target class. The training signal may be configured to maximize this probability for the target class. Thus, the model may be encouraged to provide a correct classification of the sensor data.

For the density estimation, the training signal may be further based on a probability of the sensor data being generated according to the generative model based on the concentration parameters. As discussed, the concentration parameters may define a probability distribution over class probabilities for the respective classes. Based on these class probabilities, the generative model may determine parameters of a probability distribution over sensor data. The training signal may be configured to maximize the probability of the sensor data of the training dataset occurring according to this probability distribution. Thus, the model may be trained in such a way that, for sensor data according to the training dataset, applying the inference model followed by the generative model, results in a relatively higher probability of the sensor data being reproduced than for sensor data that is not according to the training dataset. Thus, this probability may be used as an out-of-distribution value. This results in more accurate out-of-distribution values, but at the same time also provides a calibration of the class probability values since these are determined from the same concentration parameters that are also used in the density estimation.

Optionally, applying the classification model may involve outputting the out-of-distribution value. For example, the out-of-distribution value may be obtained by comparing the probability of the sensor data being generated according to the generative model to a threshold. Class probability values for one or more classes, e.g., for one or more most likely classes, for one or more requested classes, or for all classes, can be also output, e.g., always, or only if the out-of-distribution value indicates a sufficient correspondence.

The outputs, e.g., the out-of-distribution value and/or the class probabilities, may be used in controlling and/or monitoring the computer-controlled system. For example, the computer-controlled system may be a robot, a vehicle, a domestic appliance, a power tool, a manufacturing machine, a personal assistant or an access control system. These are examples of systems that are controlled based on sensor data measured from the system and/or its environment, and that thus have the problem that they may be applied in situations that the classifier model is not trained for, or may obtain faulty sensor measurements. Thus, the techniques provided herein can be advantageously applied. Example systems that can be monitored include a surveillance system or a medical (imaging) system.

It is in principle also possible to use the provided techniques according to the present invention for applications other than controlling and/or monitoring computer-controlled systems that use out-of-distribution values and/or class probability values. Thus, the provided method according to the present invention may be a method of classifying sensor data, e.g., images, per se, and also the provided system may be a system for classifying sensor data, e.g., images, per se, without the classification result necessarily being used for controlling and/or monitoring.

Generally, the techniques provided herein can applied to many different kinds of sensor data, for example, image data, audio data, and various other types of measurements of physical quantities, such as temperature, pressure, etc. Various examples are provided herein. In particularly, multiple respective classification models as provided herein can be applied to multiple respective types of sensor data, thus obtaining classifications with mutually comparable class probability values. The application to sensor data is not needed in principle, e.g., the classification model may operate on any model input for which OOD detection and/or class probability determination is needed.

Optionally, according to an example embodiment of the present invention, the sensor data may comprise a time series of measurements of the one or more physical quantities, e.g., at least 2, at least 5, or at least 10 points in time. In practice, classifications of time series are often important inputs in the controlling and/or monitoring of computer-controlled systems. The classification of the time series may comprise determining a class for the overall time series and/or determining respective classes for respective time points of the time series. A conventional appropriate inference model may be used. The generative model may comprise a recurrent model configured to determine parameters of a probability distribution of values of the one or more physical quantities at a time point of the time series based on parameters of the probability distribution at a preceding time point of the time series. The recurrent model may receive the overall classification of the time series as an overall input, or may receive class probabilities at a respective time point as inputs for determining the probability distribution parameters at that time point, for example.

Optionally, according to an example embodiment of the present invention, the classification model may be used in a lane keeping support system of a vehicle. The sensor data may include location information of the vehicle and/or traffic participants in the environment of the vehicle, for example, extracted from image data of one or more cameras installed on the vehicle. This location may be used to classify the sensor data into different driver tasks that the sensor data represents. In particular, the driver tasks may include a class representing the vehicle keeping its lane, and one or more classes representing the vehicle changing its lane, e.g., changing left or changing right.

Optionally, according to an example embodiment of the present invention, a generative model comprising a recurrent model may be used to predict future values of the one or more physical quantities at one or more future time points after the time series, e.g., one or more points in time that lie in the future or at least for which no measurements are available yet. These predicted future values may then be used for the controlling and/or monitoring of the computer-controlled system. For example, the recurrent generative model may be used at a time point t to predict a location of a nearest vehicle at one or more future time points t+1, t+2, by rolling out the generative model further in time. The future predictions may be used for example by a planning and control modules of an automated driving system to generate controls for the speed and/or steering angle.

Optionally, according to an example embodiment of the present invention, the sensor data may represent an image captured of the computer-controlled system and/or its environment. For example, the sensor data may be video data, radar data, LiDAR data, ultrasonic data, motion data, or thermal image data. As inference and generative models, various machine learnable models may be used that operate on images, e.g., convolutional neural networks and fully convolutional neural networks in particular, as from the related art. Thus, the classification model may be an image classification model. For example, an image classification model may classify image data into multiple respective classes corresponding to which of the multiple respective objects is present in the image. An image classification model may also output whether or not one or more respective objects is present in an image, e.g., the image classification model may be an object detection model. An image classification model may also classify respective image portions, e.g., individual pixels, into respective classes, e.g., the image classification model may be a semantic segmentation model. For example, the multiple classes of the image classification model may include a traffic sign, a road surface, a pedestrian, a vehicle, and/or a driver task of a detected vehicle.

Optionally, according to an example embodiment of the present invention, when the classifier model is a semantic segmentation model, the generative model may be configured to determine parameters of respective probability distributions for the respective image portions. Thus, the generative model may be used to determine respective out-of-distribution values for the respective image portions. The out-of-distribution values may be used to highlight image regions whose labels are uncertain. As a result, for example, these highlighted image regions may be excluded in the controlling and/or monitoring of the computer-controlled system, or other modalities can be prioritized for such regions.

Optionally, according to an example embodiment of the present invention, determining the out-of-distribution value may comprise sampling the class probabilities for the multiple classes from the Dirichlet distribution; determining the parameters of the probability distribution of the sensor data from the class probabilities; and determining a probability of the sensor data being sampled according to the parameters of the probability distribution. This allows to efficiently determine the out-of-distribution value as an approximation of the probability of the sensor data being generated according to the generative model, e.g., this approximation can also be used if the probability cannot be expressed by a closed-form expression.

Optionally, according to an example embodiment of the present invention, the concentration parameters may be restricted to being greater than or equal to one, e.g., the inference model may be defined such that it can only output values greater than or equal to one. While it is not necessary in principle to enforce this by restricting the inference model, having concentration parameters greater than one ensures that the parameters lie in the more regular part of the Dirichlet distribution, improving numerical stability during training.

Optionally, according to an example embodiment of the present invention, the determined out-of-distribution value and/or class probability value(s) may be used to decide between whether to use a regular control module or a fallback control module. If the out-of-distribution value indicates sufficient correspondence and/or a class probability value for a class indicate sufficient confidence for a classification into that class, the regular control module may be used to determine control data. Otherwise, the control data may be determined using a fallback control module. The computer-controlled system may then be controlled based on the control data. Because the provided techniques provide more accurate OOD detection and more accurate class probabilities, safety is improved by switching to the fallback control module where needed, while control is improved by using the regular control module when this is determined to be possible.

Optionally, according to an example embodiment of the present invention, the sensor data may be stored for future use if the out-of-distribution value indicates non-correspondence. Otherwise, the sensor data may be discarded. This has the advantage that it enables to more efficiently collect relevant training data. For example, a further machine learning model may be trained on the collected data. Autonomous vehicles and other types of computer-controlled systems typically collect large amounts of data, and it is often not feasible to store all collected data and/or transmit all collected data for use by a training system. Therefore, it is important to select training data that is expected to be relevant. For example the sensor data may be vehicle sensor data for autonomous driving perception. Such sensor data may be obtained by interacting with the real world during a free-form drive. Data may be constantly flowing into the sensors, but there may not be sufficient space to store them all. The determined class probability values and/or the determined out-of-distribution values may be used to determine whether or not to keep the sensor data, e.g., by making an information-theoretic calculation on an expected information gain of storing the sensor data. The sensor data can be stored at the vehicle itself, but can also be sent from the sensor to a central server and stored there. Thus, smart data selection can be achieved and data collection costs can be reduced.

Optionally, according to an example embodiment of the present invention, the generative model may be given as input a value of a context variable. The context variable may determine the prior distribution on the class probabilities, e.g., the concentration parameters. When applying the model, the value of the context variable may be determined from a set of context instances each comprising sensor data and a corresponding target class. This provides a more flexible classification model that can easily be dynamically adapted to different circumstances. For example, the context instances may be recent measurements of the physical quantities of the computer-controlled system. In a lane keeping support system, for example, the context instance may effectively represent a driver intention over the time span represented by the context instances. It is also possible to use measurements of longer time spans and/or from other computer-controlled system, so that e.g. a classification model in an autonomous or semi-autonomous vehicle may be adapted to a different type of weather, a different type of road, a different country, etcetera.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 6 shows a computer-implemented method of training a classification model, according to an example embodiment of the present invention.

FIG. 7 shows a computer-implemented method of classifying sensor data, according to an example embodiment of the present invention.

FIG. 8 shows a computer-readable medium comprising data, according to an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
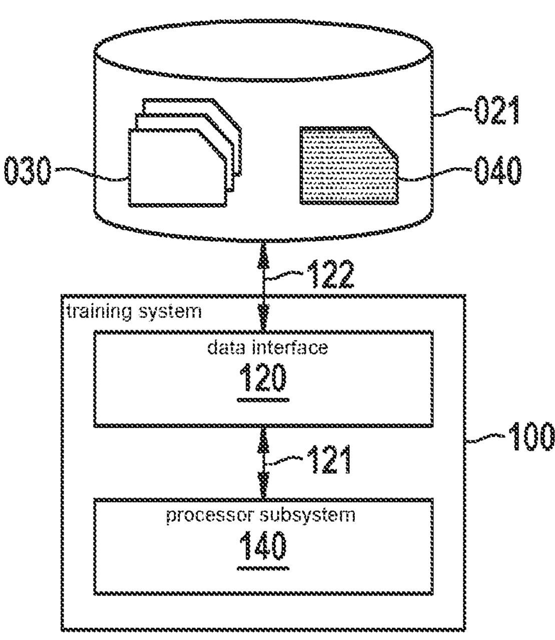
FIG. 1 shows a system for training a classification model, according to an example embodiment of the present invention.

FIG. 1 shows a system 100 for training a classification model for use in controlling and/or monitoring a computer-controlled system. The classification model may be configured to classify sensor data into a class from a set of multiple classes.

The system 100 may comprise a data interface 120. The data interface 120 may be for accessing a training dataset 030. The training dataset 030 may comprise multiple training instances, for example, at least 1000, at least 10000, or at least 100000. The training instances may be labelled training instances each comprising sensor data and a corresponding target class from the set of multiple classes. The training dataset 030 typically does not contain training instances designated to be out-of-distribution, e.g., the set 030 may be a set of in-distribution training data.

The data interface 120 may be for further accessing model data 040. Model data 040 may represent the classification model. The classification model may comprise a trainable inference model. The inference model may be configured to, based on sensor data, determine respective concentration parameters of a Dirichlet distribution of class probabilities for the respective multiple classes. The classification model may further comprise a trainable generative model. The generative model may be configured to, based on the class probabilities, determine parameters of a probability distribution of sensor data. For example, model data 040 may comprise trainable parameters of the inference model and/or the generative model. For example, the number of trainable parameters of the inference model may be at least 1000, at least 10000, or at least 1000000. For example, the number of trainable parameters of the generative model may be at least 1000, at least 10000, or at least 1000000. The model data 040 may be for use in controlling and/or monitoring a computer-controlled system according to a method described herein, e.g., by system 200 of FIG. 2 or system 300 of FIG. 3.

For example, as also illustrated in FIG. 1, the input interface may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The system 100 may further comprise a processor subsystem 140 which may be configured to, during operation of the system 100, train the classification model 040.

To train the model, processor subsystem 140 may select a training instance from the training dataset 030. The training instance may comprise sensor data and a corresponding target class of the set of multiple classes. Processor subsystem 140 may further apply the inference model to the sensor data to obtain the concentration parameters. Processor subsystem 140 may further derive a training signal for the training instance. The training signal may be based on a probability of the sensor data being classified into the target class based on the concentration parameters. The training signal may be further based on a probability of the sensor data being generated according to the generative model based on the concentration parameters. Processor subsystem 140 may update parameters 040 of the inference model and/or the generative model based on the training signal.

The system 100 may further comprise an output interface for outputting trained data 040 representing the learned (or 'trained') model. For example, as also illustrated in FIG. 1, the output interface may be constituted by the data interface 120, with said interface being in these embodiments an input/output ('IO') interface, via which the trained model data may be stored in the data storage 021. For example, the model data 040 defining the 'untrained' classification model may during or after the training be replaced, at least in part, by the model data of the trained model, in that the parameters of the model, such as weights and other types of parameters of neural networks, may be adapted to reflect the training on the training data 030.

This is also illustrated in FIG. 1 by the same reference numeral 040 referring to both the trained and the untrained model data on the data storage 021. In other embodiments, the trained model data may be stored separately from the model data defining the 'untrained' dynamics model. In some embodiments, the output interface may be separate from the data storage interface 120, but may in general be of a type as described above for the data storage interface 120.

Figure 2:
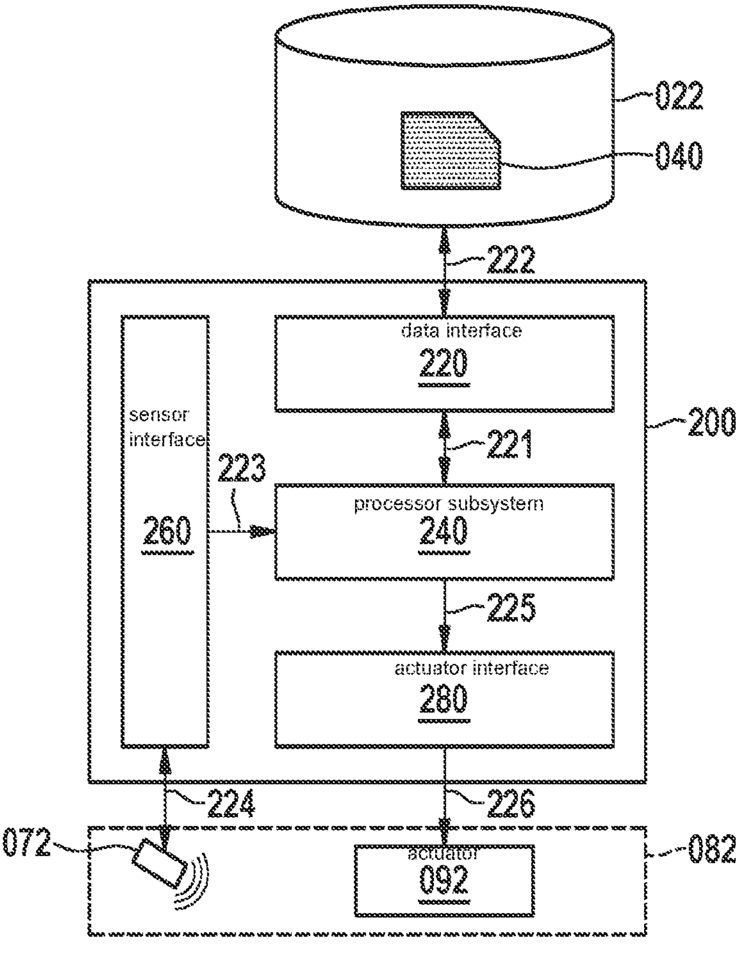
FIG. 2 shows a system for classifying sensor data, according to an example embodiment of the present invention.

FIG. 2 shows a system 200 for classifying sensor data 224 for use in controlling and/or monitoring a computer-controlled system.

The system 200 may comprise a data interface 220 for accessing for accessing model data 040 representing a classification model. The classification model may be configured to classify the sensor data into a class from a set of multiple classes. The classification model may comprise a trained inference model. The inference model may be configured to, based on the sensor data, determine respective concentration parameters of a Dirichlet distribution of class probabilities for the respective multiple classes. The classification model may further comprise a trained generative model. The generative model may be configured to, based on the class probabilities, determine parameters of a probability distribution of sensor data according to a training dataset of the classification model. The model data may comprise trained parameters of the generative model and/or the inference model. The model data 040 may have been previously trained as described herein, e.g., by the system 100 of FIG. 1 or as described elsewhere. The system 200 may train the model in addition to applying it, e.g., system 200 may be combined with the system of FIG. 1.

For example, as also illustrated in FIG. 2, the data interface may be constituted by a data storage interface 220 which may access the data 040 from a data storage 022 containing the data 040. In general, the data interface 220 and the data storage 022 may be of a same type as described with reference to FIG. 1 for the data interface 120 and the data storage 021. The storage 022 may be part of in the system 200, but can also be external. The data storage 022 can optionally also comprise the sensor data.

The system 200 may further comprise a processor subsystem 240 which may be configured to, during operation of the system 200, apply the inference model to the sensor data to obtain the concentration parameters. The processor subsystem 240 may be further configured to determine an out-of-distribution value indicating a correspondence of the sensor data to the training dataset. The out-of-distribution value may be determined by determining a probability of the sensor data being generated according to the generative model based on the concentration parameters. The processor subsystem 240 may be further configured to, at least if the out-of-distribution value indicates a sufficient correspondence (e.g., is smaller than or larger than a correspondence threshold), determine a class probability value from the concentration parameters. The class probability value may indicate a probability of the sensor data belonging to a class from the set of multiple classes. The processor subsystem 240 may be further configured to output the class probability value for use in the controlling and/or monitoring of the computer-controlled system.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

The system 200 may comprise a sensor interface 260 for obtaining the sensor data 224, e.g., from a sensor 072. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a lidar sensor, a radar sensor, a pressure sensor, a contain temperature sensor, etc. In some embodiments, the sensor data 072 may sensor measurements of different physical quantities in that it may be obtained from two or more different sensors sensing different physical quantities. The sensor data interface 260 may have any suitable form corresponding in type to the type of sensor, including but not limited to a low-level communication interface, e.g., based on I2C or SPI data communication, or a data storage interface of a type as described above for the data interface 220.

In some embodiments, the system 200 may comprise an actuator interface 280 for providing control data 226 to an actuator 092 in the environment 082. Such control data 226 may be generated by the processor subsystem 240 to control the actuator based on the determined out-of-distribution value and/or class probability value(s). The actuator may be part of system 200, for example, system 200 can itself be the system being controlled. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-) autonomous vehicle.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on the out-of-distribution value and/or the class probability value(s). The sensory perceptible output signal may be directly indicative of these outputs, but may also represent a derived sensory perceptible output signal, e.g., for use in guidance, navigation or other type of control of the physical system.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may be represent a control system configured to control the physical entity.

Figure 3:
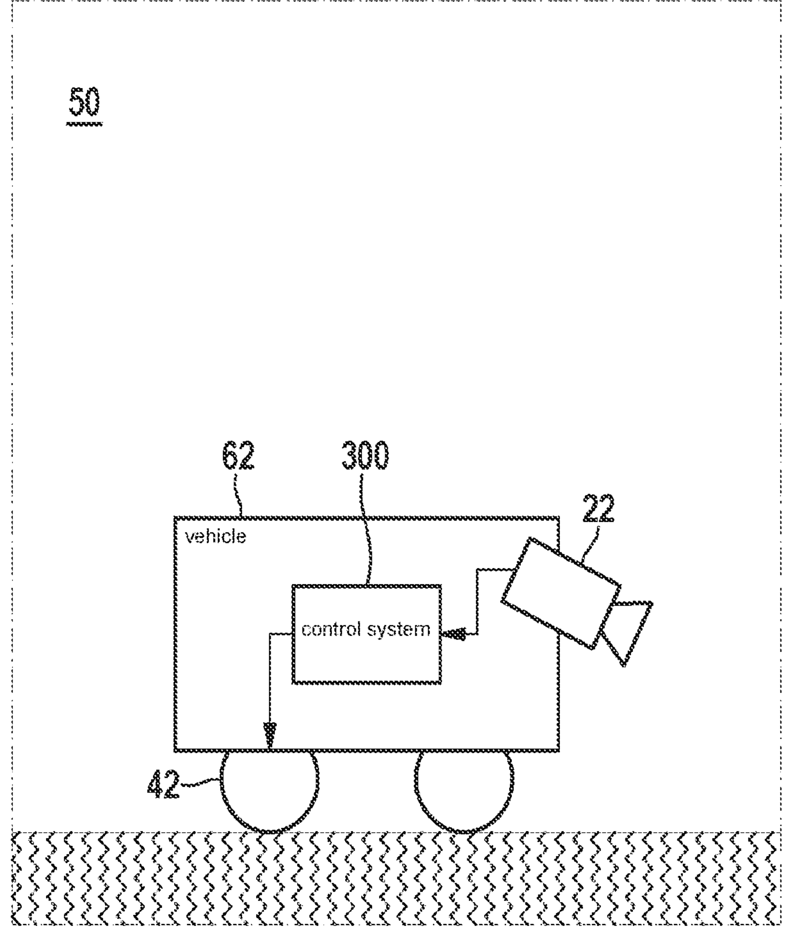
FIG. 3 shows a system for classifying sensor data for use in controlling a (semi-)autonomous vehicle, according to an example embodiment of the present invention.

FIG. 3 shows an example of the above, in that the system for classifying sensor data, e.g., system 200 of FIG. 2, is shown to be part of a control system 300 of a (semi-) autonomous vehicle 62 operating in an environment 083. The vehicle 62 may be autonomous in that it may comprise an autonomous driving system or a driving assistant system, with the latter also being referred to as a semiautonomous system.

The autonomous vehicle 62 may for example incorporate the classification system as part of a lane keeping support system 300. The classification system may receive as input a time series of location information of the vehicle 62 and/or traffic participants in the environment 083 of the vehicle, e.g., representing a highway scene and characterizing the behaviour of the vehicle over time, in for example the last five seconds. For example, as shown in the figure, the location information may be extracted from images of the environment of the vehicle 62 taken by a camera 22 mounted on the vehicle.

The classification system may classify this time-series sensor data into respective classes representing respective driver tasks of a driver of the vehicle, e.g., keeping lane or changing lane. To analyse such time series data, the inference model may comprise a recurrent model that outputs the classification based on inputting data of respective time points, as is conventional. Also the generative model used to make the OOD detection can be a recurrent model that may be configured to determine parameters of a probability distribution of values of the one or more physical quantities at a time point of the time series based on parameters of the probability distribution at a preceding time point of the time series. Existing types of recurrent models can be used.

The calibrated, hence more reliable, class probability values derived from the concentration parameters may be used by the lane keeping support system 300 to make a conformity assessment on the prediction. Based on the conformity assessment, the system may decide whether to use a regular control module of the lane keeping support system or to switch to a fallback control system to control e.g. the wheels 42 of the vehicle. For example, if the predictor reports middle-level uncertainty, a safe fallback functionality may be triggered, such as a lane keeping support algorithm that is less comfortable but highly interpretable and therefore safer to use. For example, if the predictor reports high uncertainty, and/or if the out-of-distribution value indicates that the sensor data is out-of-distribution, the lane keeping support system 300 can give control back to a human driver.

While not shown specifically in this figure, the classification system may also be configured to store the sensor data for future use if the out-of-distribution value indicates non-correspondence and/or the class probability value indicates insufficient confidence. For example, the system may store the sensor data itself or transmit it for external storage. The sensor data may be discarded after use otherwise. This way, the autonomous vehicle 62 can collect relevant training data for training machine learning models for use in controlling a (semi-)autonomous vehicle. By only storing relevant sensor data, limited storage capacity at the vehicle 62 and/or limited transmission capacity for transmission to an external storage can be used more efficiently.

As another example of switching to fallback control, it is also possible to use classification models as described herein for anomaly detection in vehicle 62. In this example, the classification model may be a semantic segmentation model configured to classify respective image portions of images taken by camera 22 into respective classes. Based on the semantic segmentation, the control system 300 may compute a depth information of all pedestrians, compute a trajectory around these pedestrians, and control the vehicle 62 to follow this trajectory closely enough such that the vehicle does not hit pedestrians. Also in this case, if an out-of-distribution value for a respective image portion indicates insufficient correspondence and/or the class probability value for a respective image portion indicates insufficient confidence, the semantic segmentation may be considered insufficiently reliable and a safe fallback control system can be used. Although a (semi-)autonomous vehicle 62 is used as an example, it will be understood that the same techniques to avoid humans in its environment can be applied in any mobile robot.

Figure 4A:
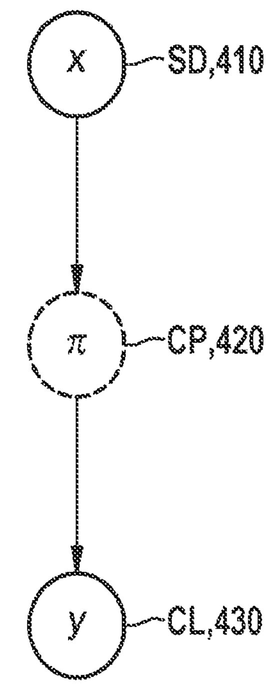
FIG. 4A shows a detailed example of a classification model that does not include a generative model, according to an example embodiment of the present invention.

FIG. 4A shows a detailed, yet non-limiting, example of a classification model that does not include a generative model. The figure shows a plate diagram, where solid circles indicate observable random variables, and dashed circles indicate latent random variables that are inferred from the observable random variables.

Shown in the figure is an evidential classifier, also known as a prior network, for example, according to the design of "Evidential Deep Learning to Quantify Classification Uncertainty". The figure shows sensor data x, SD, 410, being used to derive class probabilities π, CP, 420, from which an output variable y, CL, is determined. Such a model may be described as a hierarchical probabilistic model as follows:

$$\pi \mid x \sim Dir(\pi \mid g_\psi(x)),$$
$$y \mid \pi \sim Cat(y \mid \pi),$$

where Dir(·) is a Dirichlet distribution, $g_\psi(x)$ is a function that maps a given input x, SD e.g. an observed image, to the Dirichlet concentration parameters (also known as strength parameters), and Cat(·) is a categorical distribution that assigns a probability mass on an output variable y, CL given a sample π, CP from the prior.

Such an evidential model may be trained by minimizing the below loss with respect to ψ, e.g., the weights if $g_\psi(\cdot)$ is chosen as a neural net:

$$L_1(\theta) = E_{\pi \sim Dir(\pi|g_\psi(x))}[\|y-\pi\|_2^2] + \beta \cdot KL(Dir(\pi \mid g_\psi(x)) \| Dir(\pi \mid 1, \ldots, 1))$$

where KL(·‖·) is the Kullback-Leibler (KL) divergence between two distributions and β>0 is an annealing factor that tunes how strongly the KL term regularizes the loss.

A similar classification model that also does not include a general model may be obtained by training on a set of in-domain samples and a set of OOD samples according to the following loss function:

$$L_2(\theta, \gamma) = KL(Dir(\pi \mid g_\psi(x)) \| Dir(\gamma \cdot y)) + \beta \cdot KL(Dir(\pi \mid g_\psi(x_{ood})) \| Dir(\pi \mid 1, \ldots, 1))$$

where $x_{ood}$ is a sample from a real OOD data set, e.g. an image of a bird if the task is handwritten digit recognition, and γ>0 is an amplification factor on the one-hot coded true class labels y for the in-domain sample x.

It may be observed that these two loss functions $L_1$, $L_2$ are particular cases of the following more general pattern:

$$L(\theta) = Div(Dir(\pi \mid g_\psi(x)), p_{true}(y)) + \beta \cdot KL(Dir(\pi \mid g_\psi(x)) \| Dir(\pi \mid 1, \ldots, 1))$$

where Div(·,·) is a divergence metric between two distributions. For $L_2$ it is the KL divergence. For $L_1$, $\rho_{true}(y)$ is chosen as a point mass on y, hence Div(·,·) is then a scoring function, to be specific, it is the Brier score, while for $L_2$ it is another Dirichlet distribution whose strengths are generated from the true label y. For $L_1$, $g_\psi(x)$ is fed with in-domain data in the regularizer KL term, while $L_2$ feeds it with real OOD data for regularization.

It may be observed that loss functions according to the above pattern, e.g., not including a generative model, are in general insufficient to achieve both (i) calibrated quantification of prediction uncertainties on in-domain samples, and (ii) detection of out-of-domain OOD samples without needing to see example OOD observations during training time. This is because loss functions following the above structure lack a mechanism to assess whether a given input sample x is within the target domain or not, without getting explicit supervision from real OOD samples. Effectively, the above loss structure encourages the model to provide model outputs for in-domain samples with very high certainty. The inventors found that as a consequence, accurate class probability values may not be derivable from such models.

FIG. 48 shows a detailed, yet non-limiting, example of a classification model that includes a generative model. As in FIG. 4A, the model is shown as a plate diagram.

The classification model in this figure includes an inference model IM configured to, based on input sensor data x, SD, 410, determine respective concentration parameters $h_\psi(x)$ of a Dirichlet distribution. The Dirichlet distribution is a probability distribution of class probabilities n, CP, 420 for respective classes into which the sensor data SD is to be classified. Based on class probabilities CP, 420, the classification CL, 430, of the sensor data SD may be defined according to a categorical distribution CAT, 460. The set of possible classes is finite. For example, the number of classes may be 2, at most or at least 5, or at most or at least 10.

The classification model further comprises a generative model GM, 450, configured to, based on the class probabilities CP, determine parameters $f_\theta(n)$ of a probability distribution of sensor data SD according to the training dataset on which the classification model is trained. Based on class probabilities CP, or on the concentration parameters that generate them, an out-of-distribution value may be determined indicating a correspondence of the sensor data SD to the training dataset, by determining a probability of the sensor data SD being generated according to the generative model GM.

Thus, density estimation using generative model GM may be performed concurrently with evidential classifier training using inference model IM to learn to assess domain relevance of a given sample SD without need for explicit supervision. Mathematically, the model may be represented by the following generative design:

$$\pi \sim Dir(\pi \mid 1, \ldots, 1)$$
$$x \mid \pi \sim p_\theta(x \mid f_\theta(\pi))$$
$$y \mid \pi \sim Cat(y \mid \pi)$$

where $p_\theta(x|f_\theta((\pi))$ is a likelihood function on the input domain x, in other words, a probability distribution of sensor data. For example, the probability distribution can be a normal distribution, a categorical distribution, a Bernoulli distribution, etc., e.g.:

$$x \mid \pi \sim N(x \mid f_\theta^1(\pi), f_\theta^2(\pi)).$$

As shown in the figure, the inference model IM may be trained such that the class probabilities CP sampled from the Dirichlet distribution according to the concentration parameters given by the inference model IM, provide a variational inference approximation of class probabilities for the training dataset. In the figure, the dashed line for the inference model IM represents the dependency of the variables on the approximate posterior distribution $q_\psi(\pi_n|x_n)$.

In particular, given a training data set $D=\{(x_1, y_1), \ldots, (x_N, y_N)\}$ comprising N input-output pairs, e.g., images $x_n$ or other types of sensor data and their corresponding labels $y_n$, the inference model may be trained to provide an accurate approximation to the intractable posterior distribution on the latent evidence variables $\rho(\pi_1, \ldots, \pi_N|D)$. A training loss for this goal may be derived using variational inference, e.g., by minimizing $$KL(q_\psi(\pi_1, \ldots, \pi_N|x)||p(\pi_1, \ldots, \pi_N|D))$$

$$\text{where } q_\psi(\pi_1, \ldots, \pi_N|D) = \prod_{n=1}^{N} \frac{Dir(\pi_n|g_\psi(x_n)+1)}{q_\psi(\pi_n|x_n)}$$

where inference model $g_\psi(x_n)$ may be implemented by an appropriate K-dimensional trainable function. For example, the inference model may be defined to provide positive values. As shown in this example, the concentration parameters $g_\psi(x_n)+1$ provided by the inference model may be restricted to being greater than or equal to one, which improves numerical stability during the training. Restriction to at least one is not needed, but the output is typically restricted at least to be nonnegative. As an example, $g_\psi(\cdot)$ may be a neural net with weights $\psi$, e.g., having a softplus operator at its output layer.

Interestingly, the model may be seen as a hybrid form between evidential learning and a variational auto-encoder (VAE). The model may for this reason be referred to as an evidential variational auto-encoder. This model provides surprising advantages both from the evidential learning perspective and from the VAE perspective. From an evidential learning model perspective, introducing VAE characteristics surprisingly enables in-domain calibration. From the perspective of using the model as a VAE, in such normal use as a VAE, using a Dirichlet distribution would not be expected to be beneficial, for example, a standard normal distribution is a more typical choice in that setting. Also a model used as a VAE typically has a relatively large latent space dimension, e.g., at least 50 or at least 100. I the VAE setting, reducing this dimension would not be expected to be beneficial. Instead, in embodiments, the latent space dimension corresponds to a number of classes of a classifier and is thus e.g. smaller than 50, even at most 5 or at most 10 for example. Surprisingly, the inventors found that such a design with a Dirichlet distribution of a relatively small dimension enables the combination with evidential learning and helps to significantly improve in-domain calibration performance of the predictor.

In the above example, amortization is applied, e.g., the approximate posterior distribution $q_\psi(\pi_n|x_n)$ for the inference model is defined to be dependent on observations D. The model can also be defined in an unamortized way, e.g., using posterior distribution $q_\psi(\pi_n)$.

Figure 4B:
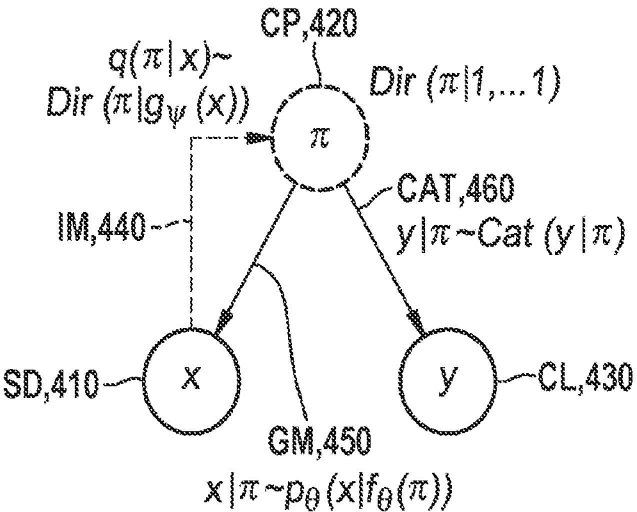
FIG. 4B shows a detailed example of a classification model that includes a generative model, according to an example embodiment of the present invention.
Figure 4C:
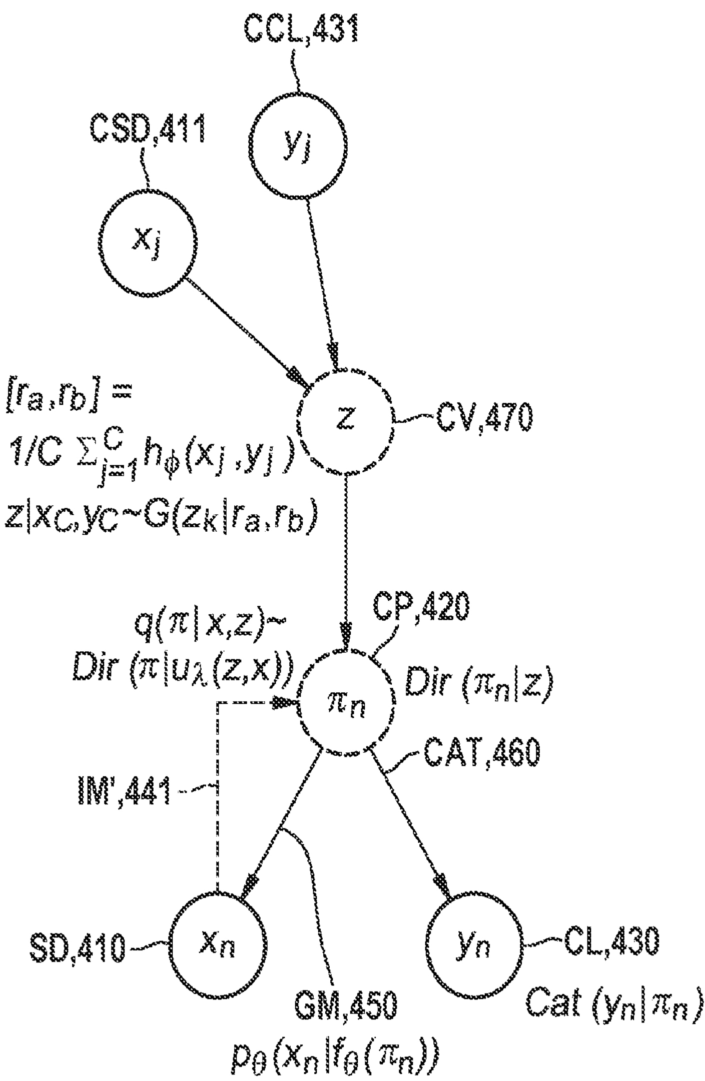
FIG. 4C shows a detailed example of a classification model that includes a generative model and that uses a context variable, according to an example embodiment of the present invention.

FIG. 4C shows a detailed, yet non-limiting, example of a classification model that includes a generative model and that uses a context variable. This example is an extension of the example of FIG. 4B. In particular, the figure shows sensor data SD, 410; an inference model IM, 441; a generative model GM, 450; class probabilities CP, 420; a categorical distribution CAT, 460; and a classification CL, 430, similar to those in FIG. 4B.

In this example, the inference model IM' is additionally given as input a value of a context variable z, CV, 470. The value of the context variable CV is determined during use of the classification model from a set of context instances, wherein a context instance comprises context sensor data $x_j$, CSD, 411 and optionally also a corresponding context target class $y_j$, CCL, 431.

In particular, as shown in the figure, the value of the context variable CV may be determined by applying a trained context model, e.g., $h_\varphi(x_j, y_j)$, to the respective context instances CSD, CCL, to obtain respective context parameter contributions; aggregating the respective context parameter contributions into a set of context parameters, e.g., $$[r_a, r_b] = 1/C\sum_{j=1}^{C} h_\phi(x_j, y_j)$$

or using another aggregation function; and determining the value of the context variable by sampling a context probability distribution according to the set of context parameters, e.g., $z|x_C, y_C \sim G(z_k|r_\alpha, r_b)$.

For example, a context variable can be real-valued or discrete, e.g., selected from 2, at most or at least 5, or at most or at least 10 possible values. As a context model to map the context set $(x_1, y_1), \ldots, (x_K, y_K)$ to the context variables CV, for example, the inference model IM' may be used, ignoring the outputs $y_k$, or a context encoder network $m(x_k, y_k)$ may be used that maps input-output pairs and that is trained jointly with the inference and generative models.

For example, the following mathematical model can be used to define the context variables CV, the class probabilities CP, the classification CL, and the sensor data SD, respectively (a normal distribution is shown for the sensor data SD but it is also possible to use another probability distribution instead):

$$[r_a, r_b] = \frac{1}{C}\sum_{j=1}^{C} h_\phi(x_j, y_j)$$

$$z|X_C, Y_C \sim \prod_{k=1}^{K} G(z_k|r_a, r_b)$$

$$\Pi \sim \prod_{n}^{N} Dir(\pi_n|z)$$

$$Y_P|\Pi \sim \prod_{n}^{N} Cat(y_n|\pi_n)$$

$$X_P|\Pi \sim \prod_{n}^{N} N(x_n|f_\theta(\pi_n), g_\psi(\pi_n))$$

In this example, the approximate posterior distribution of class probabilities CP given the sensor data SD and the context variables CV may be defined as:

$$q(\pi \mid x, z) = Dir(\pi \mid u_\lambda(z, x))$$

Prediction of a class CL based on this model may be defined as:

$$p(y_* \mid x_*, D) = \int\int p(y_* \mid \pi) q(\pi \mid x_*, z) p(z \mid X_C, Y_C) d\pi dz.$$

Generally, the classification model may include one or more context variables CV. For example, the number of such context variables may be at most or at least 5, or at most or at least 10. The use of context variables CV may allow the classification model to effectively determine whether a newly shown sample is similar to what it has seen before, e.g., to provide lower uncertainty for similar samples than for unfamiliar samples. However, it is also possible to apply a model that uses context variables if no context information CSD, CCL is available, e.g., by using the prior distribution on the Dirichlet distribution in place of it.

Figure 5A:
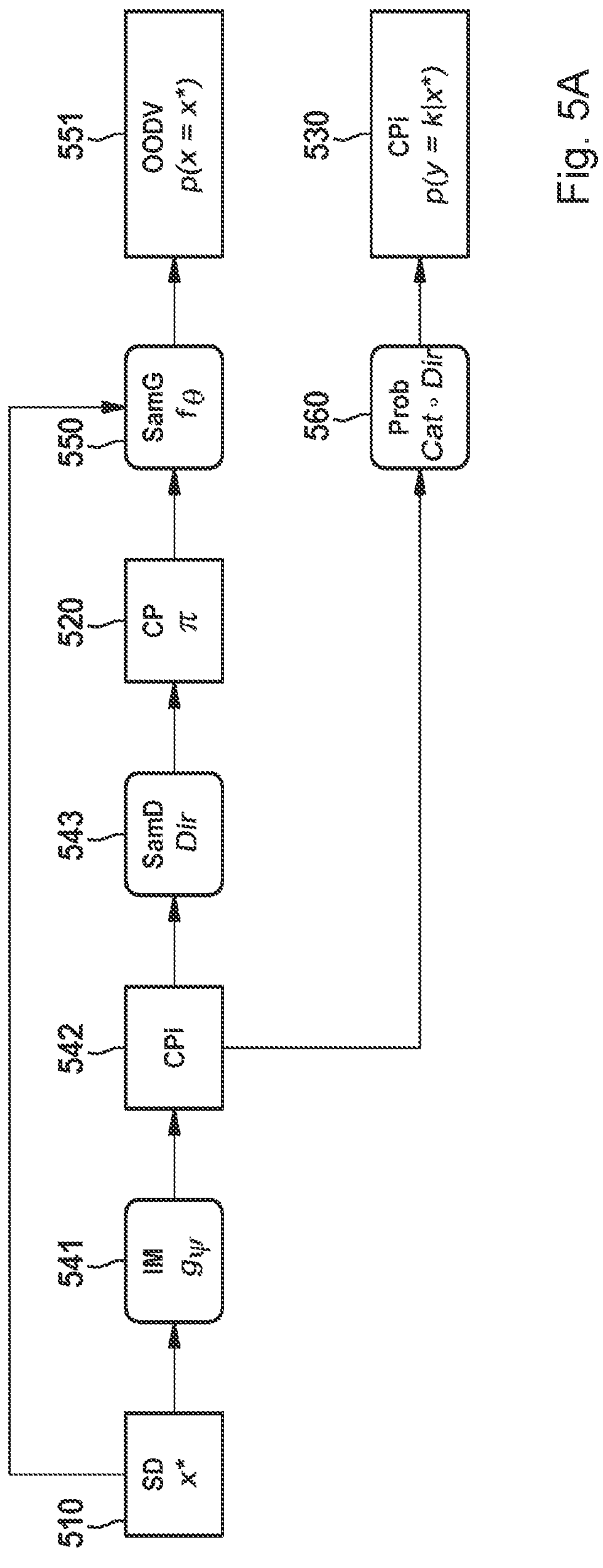
FIG. 5A shows a detailed example of how to classify sensor data using a classifier model that includes a generative model, according to an example embodiment of the present invention.

FIG. 5A shows a detailed, yet non-limiting, example of how to classify sensor data using a classifier model that includes a generative model, such as the model described with respect to FIG. 4B or the model described with respect to FIG. 4C.

Shown in the figure is a model input x*, SD, 510, e.g., representing measurements of one or more physical quantities of a computer-controlled system that is to be controlled or monitored, and/or of its environment. For example, sensor data SD may be an image, a time series of measurements of one or more physical quantities, etc.

Given the sensor data SD, an inference model $g_\psi$, IM, 541, may be used to obtain concentration parameters CPi, 542, of a Dirichlet distribution of class probabilities for the respective multiple classes into which the sensor data is to be classified. The inference model may be defined by a function $g_\psi(\cdot)$ with free parameters p that maps from the input domain to K-dimensional positive real numbers, $\alpha=g_\psi(x)$, where K is the number of classes. The function is implementable on a computer, for instance a neural network with weights θ. Interestingly, the determined concentration parameters may be used both to determine an out-of-distribution value, and to determine class probability values.

A class probability value CPi, 530, indicating a probability of the sensor data SD belonging to a class from the set of multiple classes, can be determined Prob, 560, from the concentration parameters by defining the class probability value CPi by means of a categorical distribution from class probabilities generated according to the Dirichlet distribution defined by the concentration parameters CPi.

Specifically, for a given test input x*, the predictive distribution on its label y* may be computed in closed form as:

$$Pr(y^* = k \mid x^*) = \int p(y^* = k \mid \pi) q_{\hat{\psi}}(\pi \mid x = x^*) d\pi$$
$$= \int Cat(y^* \mid \pi) Dir\left(\pi \middle| h_{\hat{\psi}}(x = x^*)\right) d\pi$$

-continued $$= \frac{\Gamma\left(1 + g_{\hat{\psi}}^k(x^*)\right)}{\Gamma\left(g_{\hat{\psi}}^k(x^*)\right)} \frac{\Gamma\left(\sum_{j=1}^K g_{\hat{\psi}}^j(x^*)\right)}{\Gamma\left(1 + \sum_{k=1}^K g_{\hat{\psi}}^j(x^*)\right)}$$

where Γ(·) is the Gamma function, $$g_\psi^j(x)$$

is the j-th output channel of the predictor $g_\psi(\cdot)$, K the number of classes in the classification problem, and k the queried class for y*.

When using context variable z determined from a set of context instances $X_C$, $Y_C$ (where the target classes $Y_C$ are optional), the class probability values may be similarly computed as:

$$p(y_* \mid x_*, D) = \int\int p(y_* \mid \pi) q(\pi \mid x_*, z) p(z \mid X_C, Y_C) d\pi dz.$$

The input may be classified into a particular class by choosing the class with highest probability mass:

$$k^*_{pred} = \text{argmax}_{k \in \{1, \cdots, K\}} Pr(y^* = k \mid x = x^*),$$

where $$k^*_{pred}$$

is the predicted class for input x*. For downstream use, such as rejecting to take action or taking a safe default action, the class probability $$Pr\left(y^* = k^*_{pred} \mid x^*\right)$$

of the predicted class and/or other classes can be used, e.g., by applying a threshold on it. Interestingly, it is noted that classification can be performed efficiently, and in particular, when performing classification there is no need to use the generative model. Still, by training the generative model together with the inference model, better-calibrated class probability values can be obtained from the inference model.

Interestingly, the concentration parameters CPi may also be used for OOD detection, in other words, outlier detection. An out-of-distribution value OODV, 551, may be determined indicating a correspondence of the sensor data SD to the training dataset on which the classification model was trained. The out-of-distribution value may be determined as a probability of the sensor data SD being generated according to the generative model $f_\theta$ based on the concentration parameters CPi, in other words, by computing the input reconstruction likelihood for the sensor data SD. Mathematically, this may be represented as follows:

$$p_\theta(x = x^*) = \int p_\theta\left(x = x^* \middle| f_{\hat{\theta}}(\pi)\right) q_\psi(\pi \mid x = x^*) d\pi.$$

Also this mathematical expression can be adapted to take into account context variables as needed.

Specifically, as illustrated in the figure, the out-of-distribution value OODV may be determined in Monte Carlo-fashion by sampling the class probabilities $\pi$, CP, 520, for the multiple classes from the Dirichlet distribution, e.g., $q_\psi(\pi|x^*)$, and then evaluating them SamG, 550, on the reconstruction probability $p_\theta(x=x^*|f_{\hat\theta}(\pi))$.

This may involve applying the generative model $f_{\hat\theta}(\pi)$ to determine parameters of the probability distribution $p_\theta$ of the sensor data. The generative model may be defined by a function $f_\theta(\cdot)$ with free parameters $\theta$ that maps from the domain of K-dimensional simplexes to the input domain, e.g., $x=f_\theta(\pi)$. The function is implementable on a computer, for instance a neural network with weights $\theta$ or other conventional techniques.

Based on the determined parameters, a probability may be determined of the sensor data SD being generated according to those probabilities. This computation may be based on sampling from $p_\theta(x|\lambda)$, e.g., using an unbiased sampler. The probability distribution can be a normal distribution, with respective means and optionally also respective standard deviations being output by the generative model, for example.

The out-of-distribution value OODV can be the determined probability, or can be obtained from this probability by thresholding, for example, a sample $x^*$ can be characterized as OOD or outlier if $u_{ood}=p_{\hat\theta}(x=x^*)<\epsilon$ for threshold $\epsilon>0$ chosen based on the safety requirements of the application at hand. It is noted that the probability $p_{\hat\theta}(x=x^*)$ is typically not a calibrated probability like the class probability CPi, e.g., e.g., may not accurately indicate a probability of sensor data being OOD or not. Still, the probability $p_{\hat\theta}(x=x^*)$ may provide a relative measure of OOD-ness and thus be useful.

Depending on the application, the out-of-distribution value OODV and/or the class probabilities CPi for one or more classes may be output. For example, the class probabilities may be determined only if the sensor data SD is not determined to be out-of-distribution, but it is also possible to compute them regardless of whether the sensor data is OOD. For example, a possible prediction output may comprise the predicted class $$k^*_{pred},$$

and optionally a class probability value for that class; and a binary decision $u_{ood}$ on if the input sample is OOD.

In various embodiments, the sensor data SD may comprise a time series of measurements of one or more physical quantities. In such cases, the inference model IM and/or the generative model SamG may comprise a recurrent model, such as a recurrent model, such as a recurrent neural network. For example, the recurrent neural network may be a gated recurrent unit (GRU)-based or a long short-term memory (LTSM)-based neural network. Based on the configuration of the Dirichlet concentration parameters CPi, various dynamics modalities are possible. For example, the concentration parameters CPi determined by the inference model IM may generate a discrete class label per time point for multiple time points, such that the classification model forecasts a time series comprising continuous and/or discrete variables, e.g., to perform sequence-to-sequence classification. The Dirichlet variable may also be constrained to a single value in a single forecast, in which case the classification model may perform a classification of the overall time series.

Also the generative model SamG may use a recurrent model to determine the parameters of the probability distribution for generating the sensor data at respective time points. For example, the model may determine parameter(s) for a given time point based on parameters for a previous time point and concentration parameter(s) for the given time point. Interestingly, this allows to determine not just an out-of-distribution value OODV for the overall time series, but also respective out-of-distribution values for respective time points, e.g., to take into account when using classifications of the respective time points.

In various embodiments, the sensor data SD may comprise image data. Also in such cases, the inference model IM can perform a classification of the overall image, but also of respective image regions, e.g., the classification model may be a semantic segmentation model. In the latter case, the generative model can be an image-to-image transformation model that determines parameters of respective probability distributions for the respective image portions. Similarly to the time series case, this allows to not just determine an overall out-of-distribution value, but also respective out-of-distribution values for the respective image portions. For example, the generative model may determine respective means and optionally also standard deviations for the respective image portions. Suitable conventional image-to-image transformation models can be readily applied.

Figure 5B:
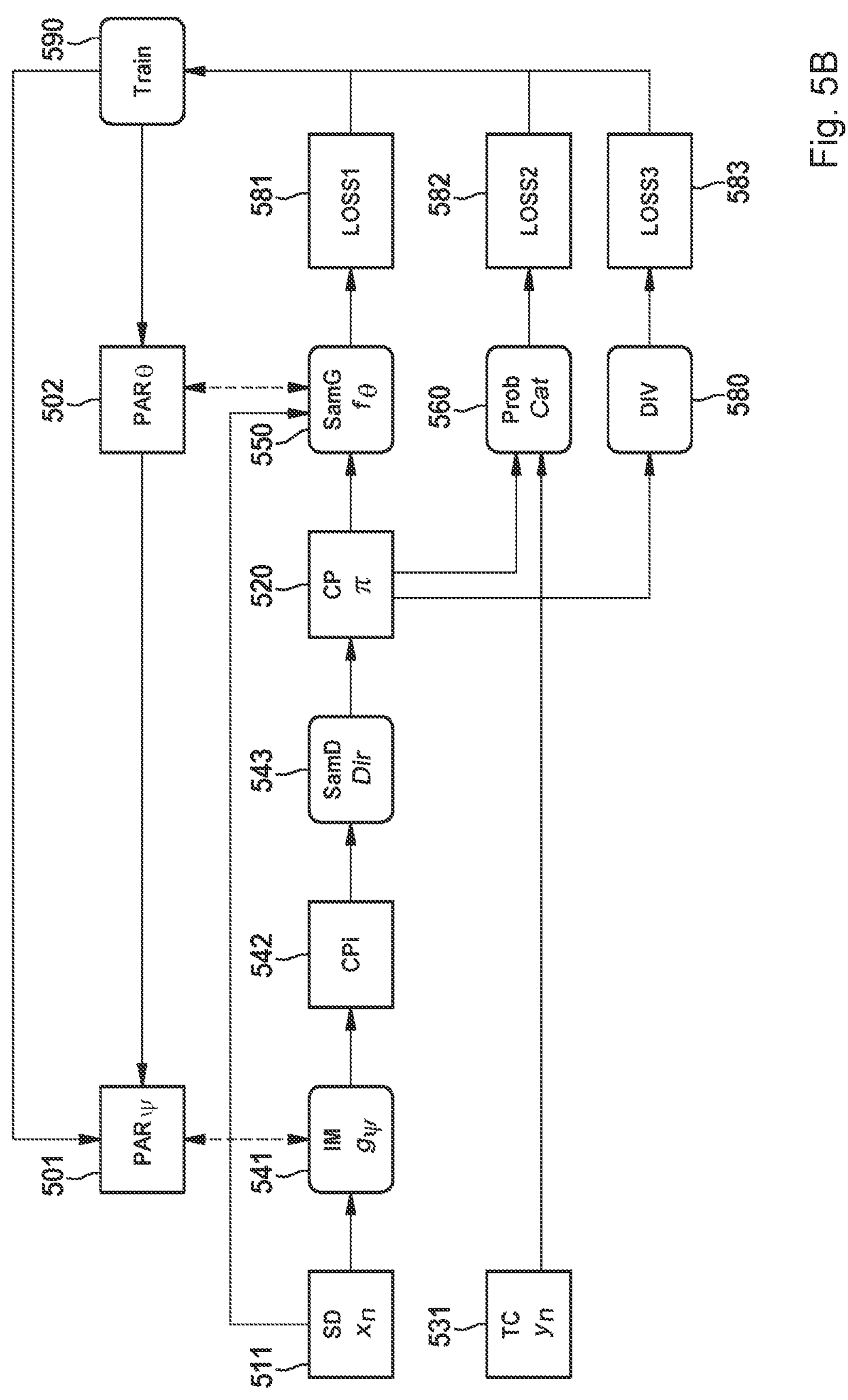
FIG. 5B shows a detailed example of how to train a classifier model that includes a generative model, according to an example embodiment of the present invention.

FIG. 5B shows a detailed, yet non-limiting, example of how to train a classifier model that includes a generative model, such as the model described with respect to FIG. 4B or the model described with respect to FIG. 4C. The various options for such a model described with respect to FIG. 5A apply here as well.

Training may be based on a training dataset comprising multiple training instances. The training instances are labelled. For illustrative purposes, a training instance is shown comprising sensor data $x_n$, SD, 511, and a corresponding target class $y_n$, TC, 531. The training dataset may be denoted $D=\{(x_1, y_1), \ldots, (x_N, y_N)\}$ where $x_n$ is from an input domain and $y_n \in \{1, \ldots, K\}$ for a class count K.

As part of the training, the inference model $g_\psi$, IM, 541, may be applied to the sensor data SD to obtain concentration parameters CPi, 542 of a Dirichlet distribution Dir, 543, of class probabilities $\pi$, CP, 520 for the respective multiple classes. Based on the concentration parameters CPi, both a loss for inferences by the inference model IM may be derived, and a loss for using these concentration parameters to reconstruct the sensor data. Interestingly, the inventors found that because the concentration parameters IM are used for reconstruction as well as inference, calibration of the class probabilities of the inferences is improved.

Specifically, as shown in the figure, the training signal may include a loss term LOSS2, 582, determined Prob, 560, based on a probability of the sensor data SD being classified in the target class TC cased on the concentration parameters. This loss term may be used to learn an accurate label predictor. For example, this loss term may be implemented as $E_{q_\psi}(\pi_n|x_n)[\log \mathrm{Cat}(y_n|\pi_n)]$. This loss term is shown here as being based on sampled class probabilities CP, but similarly to FIG. 5A, may also be computed directly from the concentration parameters CPi without sampling.

A further loss term LOSS1, 581, is shown being determined SamG, 550, based on a probability of the sensor data SD being generated according to the generative model $f_\theta$ based on the concentration parameters CP. This term may be implemented by the expression $E_{q_\psi}(\pi_n|x_n)[\log p_\theta(x_n|f_\theta(\pi_n))]$, and may map the latent representation of $x_n$, which is a discrete probability distribution of class assignments, to the observable input domain. This term may learn to generate samples from class assignment probabilities CP. This term may thus encourage the model to provide uncertainty estimates that are compliant to the data generation process. Interestingly, this is possible without flattening the decision boundary or using external samples.

As shown in the figure, the training signal may also optionally include a third loss term LOSS3, 583, determined DIV, 580, to provide a regularization of the determined class probabilities CP, for example, by penalizing a divergence from class probabilities representing maximal uncertainty. This term can be implemented for example as $KL(q_\psi(\pi_n|x_n)\|Dir(\pi|1, \ldots, 1))$. Using this regularization term, divergences from the "I do not know" state characterized by the flat Dirichlet distribution that do not serve for explaining data may be penalized.

For example, the above three losses may be combined into the following Evidence Lower Bound (ELBO) loss function, to be maximized with respect to the trainable parameters $\{\theta, \psi\}$ of the generative model and the inference model, respectively:

$$L_{EVAE}(\theta, \psi) = \sum_{n=1}^{N} \Big\{ E_{q\psi(\pi_n|x_n)}[\log p_\theta(x_n|f_\theta(\pi_n))] + E_{q\psi(\pi_n|x_n)}[\log Cat(y_n|\pi_n)] - KL(q_\psi(\pi_n|x_n))\|Dir(\pi|1, \ldots, 1)) \Big\}$$

The first term may learn to fit in-domain data; the second term may learn the in-domain distribution, e.g., the uncertainty; and the third term may provide regularization.

The above loss function may be adapted to use a context variable, e.g., as discussed with respect to FIG. 4C and FIG. 5A, as follows:

$$\text{argmax}_{\theta,\phi,\psi,\lambda} \sum_{n}^{N} E_{p(z|X_C, Y_C)} \Big\{ E_{q(\pi_n|z,x_n)}[\log Cat(y_n|\pi_n)] + E_{q(\pi_n|z,x_n)}[\log N(x_n|f_\theta(\pi_n), g_\phi(\pi_n)))] - KL(q(\pi_n|z, x_n)|p(\pi_n)) + KL(Dir(\pi|u_\lambda(z, f_\theta(1, \ldots, 1)))\|Dir(\pi|1, \ldots, 1)) \Big\}$$

For example, during training, a randomly chosen subset of the training observations within a minibatch may be used as a set of context instances.

Based on the training signal, e.g., the combination of losses LOSS1, LOSS2, and optionally also LOSS3, the parameters PARO, 501, of the inference model and/or the parameters PARθ, 502, of the generative model may be updated in a training operation Train, 590. For example, the training may be performed in an iterative fashion where in each iteration one or both of the sets of parameters are updated. Trainable parameters used for determining context variables, if using, may be updated as well.

Training Train may be performed with an unconstrained optimizer, such as Adam. disclosed in Kingma and Ba, "Adam: A Method for Stochastic Optimization" (available at https://arxiv.org/abs/1412.6980 and incorporated herein by reference); stochastic gradient descent; or RMSProp. Such optimization methods may be heuristic and/or arrive at a local optimum. Training may be performed on an instance-by-instance basis or in batches, e.g., of at most or at least 64 or at most or at least 256 instances. The training signal may be implemented using an auto-differentiable library, e.g., PyTorch or TensorFlow. Using the training Train, the learned values $(\hat{\psi}, \hat{\theta})$ for the free parameters of the generative model $f_\theta(\cdot)$ and the inference model $g_\psi(\cdot)$ may be determined.

In many cases, the loss terms LOSS1 and LOSS3 may be implemented by computing their respective analytical solutions. In some cases, an analytical solution for loss term LOSS2 may be available as well. An alternative is to use a differentiable Monte Carlo sampling method, as is illustrated by sampling operation SamD, 543 to sample class probabilities and sampling operation SamG to sample parameters of the probability distribution of sensor data. For example, a "rsample" (the "r" meaning reparameterizable) method may be used as available in available deep learning libraries.

FIG. 6 shows a block-diagram of computer-implemented method 600 of training a classification model. The model may be for use in controlling and/or monitoring a computer-controlled system. The classification model may be configured to classify sensor data into a class from a set of multiple classes. The method 600 may correspond to an operation of the system 100 of FIG. 1. However, this is not a limitation, in that the method 600 may also be performed using another system, apparatus or device.

The method 600 may comprise, in an operation titled "OBTAIN TRAINING DATA", obtaining 610 a training dataset comprising multiple training instances.

The method 600 may comprise, in an operation titled "ACCESS MODEL DATA", accessing 620 model data representing the classification model. The classification model may comprise a trainable inference model. The inference model may be configured to, based on sensor data, determine respective concentration parameters of a Dirichlet distribution of class probabilities for the respective multiple classes. The classification model may further comprise a trainable generative model. The generative model may be configured to, based on the class probabilities, determine parameters of a probability distribution of sensor data.

The method 600 may comprise, in an operation titled "TRAIN MODEL", train 630 the classification model. The training of the classification may comprise, in an operation titled "SELECT INSTANCE", selecting 640 a training instance from the training dataset. The training instance may comprise sensor data and a corresponding target class of the set of multiple classes. The training of the classification may comprise, in an operation titled "APPLY INFERENCE MODEL", applying 650 the inference model to the sensor data to obtain the concentration parameters. The training of the classification may comprise, in an operation titled "DERIVE TRAINING SIGNAL", deriving 660 a training signal for the training instance. The training signal may be based on a probability of the sensor data being classified in the target class based on the concentration parameters. The training signal may be further based on a probability of the sensor data being generated according to the generative model based on the concentration parameters. The method 600 may comprise, in an operation titled "UPDATING MODEL", updating 670 parameters of the inference model and/or the generative model based on the training signal.

FIG. 7 shows a block-diagram of computer-implemented method 700 of classifying sensor data for use in controlling and/or monitoring a computer-controlled system. The method 700 may correspond to an operation of the system 200 of FIG. 2 or the system 300 of FIG. 3. However, this is not a limitation, in that the method 700 may also be performed using another system, apparatus or device.

The method 700 may comprise, in an operation titled "OBTAIN MODEL DATA", obtaining 710 model data representing a classification model. For example, the classification model may have been previously trained according to a method described herein. The classification model may be configured to classify the sensor data into a class from a set of multiple classes. The classification model may comprise a trained inference model. The inference model may be configured to, based on sensor data, determine respective concentration parameters of a Dirichlet distribution of class probabilities for the respective multiple classes. The classification model may further comprise a trained generative model. The generative model may be configured to, based on the class probabilities, determine parameters of a probability distribution of sensor data.

The method 700 may comprise, in an operation titled "OBTAIN SENSOR DATA", obtaining 720 the sensor data. The sensor data may represent measurements of one or more physical quantities of the computer-controlled system and/or its environment.

The method 700 may comprise, in an operation titled "APPLY INFERENCE MODEL", applying 730 the inference model to the sensor data to obtain the concentration parameters.

The method 700 may comprise, in an operation titled "DETECT OOD", determining 740 an out-of-distribution value indicating a correspondence of the sensor data to the training dataset. The determining 740 may be performed by determining a probability of the sensor data being generated according to the generative model based on the concentration parameters.

The method 700 may comprise, in an operation titled "DETERMINING CLASS PROBABILITY", determining 760 a class probability value from the concentration parameters. The class probability value may indicate a probability of the sensor data belonging to a class from the set of multiple classes. The method 700 may further comprise, in an operation titled, "OUTPUT CLASS PROBABILITY", outputting 770 the class probability value for use in the controlling and/or monitoring. The determining 760 and the outputting 770 may be performed conditionally, for example, at least if, in a decision labelled "SUFFICIENT CORRESPONDENCE?", the out-of-distribution value indicates 750 a sufficient correspondence.

It will be appreciated that, in general, the operations of method 600 of FIG. 6 and method 700 of FIG. 7 may be performed in any suitable order, e.g., consecutively, simultaneously, or a combination thereof, subject to, where applicable, a particular order being necessitated, e.g., by input/output relations. Some or all of the methods may also be combined, e.g., method 700 of applying a trained model may be applied subsequently to this trained model being trained according to method 600.

The method(s) may be implemented on a computer as a computer implemented method, as dedicated hardware, or as a combination of both. As also illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows an optical disc 800. Alternatively, the computer readable medium 800 may comprise transitory or non-transitory data 810 representing model data representing a classification model, for example, trained according to a method described herein and/or for use according to a method as described herein. The classification model may comprise a trainable inference model configured to, based on sensor data, determine respective concentration parameters of a Dirichlet distribution of class probabilities for respective multiple classes. The classification model may further comprise a trainable generative model configured to, based on the class probabilities, determine parameters of a probability distribution of sensor data according to a training dataset of the classification model.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Any reference signs placed between parentheses shall not be construed as limiting the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as being enumerated by several means, several of these means may be embodied by one and the same item of hardware. The mere fact that certain measures are described separately does not indicate that a combination of these measures cannot be used to advantage.

The invention claimed is:

1. A computer-implemented method comprising:

classifying sensor data for use in controlling and/or monitoring a computer-controlled system, wherein the classifying comprises the following steps:

obtaining model data representing a classification model, wherein the classification model is configured to classify the sensor data into a class from a set of multiple classes, wherein the classification model includes:

a trained inference model configured to, based on the sensor data, determine respective concentration parameters of a Dirichlet distribution of class probabilities for the respective multiple classes, and a trained generative model configured to, based on the class probabilities, determine parameters of a probability distribution of sensor data according to a training dataset of the classification model;

obtaining the sensor data, wherein the sensor data represents measurements of one or more physical quantities of the computer-controlled system and/or an environment of the computer-controlled system;

applying the inference model to the sensor data to obtain the concentration parameters;

determining an out-of-distribution value indicating a correspondence of the sensor data to the training dataset, by determining a probability of the sensor data being generated according to the generative model based on the concentration parameters; and at least when the out-of-distribution value indicates a sufficient correspondence, determining a class probability value from the concentration parameters, wherein the class probability value indicates a probability of the sensor data belonging to a class from the set of multiple classes, and outputting the class probability value for use in the controlling and/or monitoring.

2. The method of claim 1, wherein the sensor data includes a time series of measurements of the one or more physical quantities, wherein the generative model includes a recurrent model configured to determine parameters of a probability distribution of values of the one or more physical quantities at a time point based on parameters of the probability distribution at a preceding time point.

3. The method of claim 2, further comprising:

controlling a lane keeping support system of a vehicle based on the determined class probability value;

wherein the sensor data includes location information of the vehicle and/or traffic participants in the environment of the vehicle, and wherein the respective classes represent respective driver tasks of a driver of the vehicle.

4. The method of claim 3, further comprising:

using the generative model to predict future values of the one or more physical quantities at one or more future time points after the time series, and outputting the predicted future values for use in the controlling and/or monitoring.

5. The method of claim 1, wherein the sensor data represents an image captured of the computer-controlled system and/or the environment.

6. The method of claim 5, wherein the classification model is a semantic segmentation model configured to classify respective image portions of the image into respective classes.

7. The method of claim 6, wherein the generative model is configured to determine parameters of respective probability distributions for the respective image portions, and wherein the method further comprises determining respective out-of-distribution values for the respective image portions.

8. The method of claim 1, wherein the concentration parameters are restricted to being greater than or equal to one.

9. The method of claim 1, further comprising, when the out-of-distribution value indicates sufficient correspondence and/or the class probability value indicates sufficient confidence, using a regular control module to determine control data for controlling the computer-controlled system, and otherwise using a fallback control module to determine the control data; and controlling the computer-controlled system based on the control data.

10. The method of claim 1, further comprising storing the sensor data for future use when the out-of-distribution value indicates non-correspondence and/or the class probability value indicates insufficient confidence, and discarding the sensor data otherwise.

11. The method of claim 1, wherein the inference model is additionally given as input a value of a context variable, and wherein the method further comprises determining the value of the context variable from a set of context instances, wherein a context instance includes sensor data and optionally a corresponding target class.

12. A computer-implemented method of training a classification model for use in controlling and/or monitoring a computer-controlled system, wherein the classification model is configured to classify sensor data into a class from a set of multiple classes, the method comprising the following steps:

obtaining a training dataset including multiple training instances;

accessing model data representing the classification model, wherein the classification model includes:

a trainable inference model configured to, based on sensor data, determine respective concentration parameters of a Dirichlet distribution of class probabilities for the respective multiple classes, and a trainable generative model configured to, based on the class probabilities, determine parameters of a probability distribution of sensor data;

training the classification model by:

selecting a training instance from the training dataset, wherein the training instance includes sensor data and a corresponding target class of the set of multiple classes, applying the inference model to the sensor data to obtain the concentration parameters, deriving a training signal for the training instance, wherein the training signal is based on a probability of the sensor data being classified in the target class based on the concentration parameters, and wherein the training signal is further based on a probability of the sensor data being generated according to the generative model based on the concentration parameters, and updating parameters of the inference model and/or the generative model based on the training signal.

13. A system comprising:

a data interface for accessing model data representing a classification model, wherein the classification model is configured to classify sensor data into a class from a set of multiple classes for use in controlling and/or monitoring a computer-controlled system, wherein the classification model includes:

a trained inference model configured to, based on the sensor data, determine respective concentration parameters of a Dirichlet distribution of class probabilities for the respective multiple classes, and a trained generative model configured to, based on the class probabilities, determine parameters of a probability distribution of sensor data according to a training dataset of the classification model;

a sensor interface configured to obtain the sensor data, wherein the sensor data represents measurements of one or more physical quantities of the computer-controlled system and/or an environment of the computer-controlled system; and a processor subsystem configured to:

apply the inference model to the sensor data to obtain the concentration parameters;

determine an out-of-distribution value indicating a correspondence of the sensor data to the training dataset, by determining a probability of the sensor data being generated according to the generative model based on the concentration parameters; and at least if the out-of-distribution value indicates a sufficient correspondence, determine a class probability value from the concentration parameters, wherein the class probability value indicates a probability of the sensor data belonging to a class from the set of multiple classes, and output the class probability value for use in the controlling and/or monitoring.

14. A system for training a classification model for use in controlling and/or monitoring a computer-controlled system, wherein the classification model is configured to classify sensor data into a class from a set of multiple classes, the system comprising:

a data interface for accessing: a training dataset including multiple training instances, and model data representing the classification model, wherein the classification model includes:

a trainable inference model configured to, based on sensor data, determine respective concentration parameters of a Dirichlet distribution of class probabilities for the respective multiple classes, and a trainable generative model configured to, based on the class probabilities, determine parameters of a probability distribution of sensor data; and a processor subsystem configured to train the classification model by:

selecting a training instance from the training dataset, wherein the training instance includes sensor data and a corresponding target class of the set of multiple classes, applying the inference model to the sensor data to obtain the concentration parameters, deriving a training signal for the training instance, wherein the training signal is based on a probability of the sensor data being classified into the target class based on the concentration parameters, and wherein the training signal is further based on a probability of the sensor data being generated according to the generative model based on the concentration parameters, and updating parameters of the inference model and/or the generative model based on the training signal.

15. A non-transitory computer-readable medium on which are stored instructions for classifying sensor data for use in controlling and/or monitoring a computer-controlled system, the instructions, when executed by a processor system, causing the processor system to perform the following steps:

obtaining model data representing a classification model, wherein the classification model is configured to classify the sensor data into a class from a set of multiple classes, wherein the classification model includes:

a trained inference model configured to, based on the sensor data, determine respective concentration parameters of a Dirichlet distribution of class probabilities for the respective multiple classes, and a trained generative model configured to, based on the class probabilities, determine parameters of a probability distribution of sensor data according to a training dataset of the classification model;

obtaining the sensor data, wherein the sensor data represents measurements of one or more physical quantities of the computer-controlled system and/or an environment of the computer-controlled system;

applying the inference model to the sensor data to obtain the concentration parameters;

determining an out-of-distribution value indicating a correspondence of the sensor data to the training dataset, by determining a probability of the sensor data being generated according to the generative model based on the concentration parameters; and at least when the out-of-distribution value indicates a sufficient correspondence, determining a class probability value from the concentration parameters, wherein the class probability value indicates a probability of the sensor data belonging to a class from the set of multiple classes, and outputting the class probability value for use in the controlling and/or monitoring.

16. The method of claim 1, further comprising training the classification model prior to the obtaining of the sensor data, the training comprising:

obtaining a training dataset including multiple training instances;

accessing trainable model data for training the classification model, the trainable model data including:

a trainable inference model; and a trainable generative model;

selecting a training instance from the training dataset, wherein the training instance includes training sensor data and a corresponding target class of the set of multiple classes;

applying the trainable inference model to the training sensor data to obtain training concentration parameters;

deriving a training signal for the training instance, wherein the training signal is based on:

a probability of the training sensor data being classified into the target class based on the training concentration parameters; and a probability of the training sensor data being generated according to the trainable generative model based on the training concentration parameters; and updating parameters of the trainable inference model and/or the trainable generative model based on the training signal to yield the trained inference model and the trained generative model.

17. The system of claim 13, further comprising a further processor subsystem, wherein for training the classification model prior to the obtainment of the sensor data, the further processor subsystem is configured to:

obtain a training dataset including multiple training instances;

access trainable model data for training the classification model, the trainable model data including:

a trainable inference model; and a trainable generative model;

select from the training dataset a training instance that includes training sensor data and a corresponding target class of the set of multiple classes;

apply the trainable inference model to the training sensor data to obtain training concentration parameters;

derive for the training instance a training signal based on:

a probability of the training sensor data being classified into the target class based on the training concentration parameters; and a probability of the training sensor data being generated according to the trainable generative model based on the training concentration parameters; and update parameters of the trainable inference model and/or the trainable generative model based on the training signal to yield the trained inference model and the trained generative model.

* * * * *